United States Patent
Franke et al.

(10) Patent No.: US 10,807,525 B2
(45) Date of Patent: Oct. 20, 2020

(54) LIGHTING DEVICE FOR LIGHTING THE INTERIOR OF A TRANSPORTATION VEHICLE

(71) Applicant: VOLKSWAGEN AKTIENGESELLSCHAFT, Wolfsburg (DE)

(72) Inventors: Stefan Franke, Meinersen (DE); Klaus Zander, Hötensleben (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 16/616,190

(22) PCT Filed: Apr. 5, 2018

(86) PCT No.: PCT/EP2018/058778
§ 371 (c)(1),
(2) Date: Nov. 22, 2019

(87) PCT Pub. No.: WO2018/219531
PCT Pub. Date: Dec. 6, 2018

(65) Prior Publication Data
US 2020/0130572 A1    Apr. 30, 2020

(30) Foreign Application Priority Data
May 29, 2017  (DE) .......... 10 2017 208 999

(51) Int. Cl.
*F21V 21/00* (2006.01)
*B60Q 3/60* (2017.01)
(Continued)

(52) U.S. Cl.
CPC ............. *B60Q 3/60* (2017.02); *B60Q 3/10* (2017.02); *B60Q 3/78* (2017.02); *F21V 7/005* (2013.01);
(Continued)

(58) Field of Classification Search
CPC .... B60Q 3/60; B60Q 3/78; B60Q 3/10; F21V 7/008; F21V 7/005; F21V 15/01; F21Y 2103/10
(Continued)

(56) References Cited

U.S. PATENT DOCUMENTS 4,929,866 A * 5/1990 Murata ................ G02B 6/0036
313/500
8,262,253 B2   9/2012 Zlotnikov et al.
(Continued)

FOREIGN PATENT DOCUMENTS

AT           516127 A1    2/2016
CN         101180496 A    5/2008
(Continued)

OTHER PUBLICATIONS

LED Color-Changing Strip Light; downloaded from the Internet prior to May 29, 2017.
(Continued)

*Primary Examiner* — Laura K Tso
(74) *Attorney, Agent, or Firm* — Barnes & Thornburg LLP

(57) ABSTRACT

A lighting device for lighting the interior of a transportation vehicle having an oblong housing by which a belt carrier having light sources is held. The housing is a reflector element having at least one reflector chamber in which light beams, which are emitted from the light sources are reflected in a diffuse state before the light beams arrive at a light emission opening. A lighting device providing an extremely homogeneous light emission with an extremely compact design.

18 Claims, 5 Drawing Sheets

(51) Int. Cl.
*B60Q 3/78* (2017.01)
*B60Q 3/10* (2017.01)
*F21V 7/00* (2006.01)
*F21V 15/01* (2006.01)
*F21Y 103/10* (2016.01)
*F21Y 115/10* (2016.01)
*F21Y 107/70* (2016.01)

(52) U.S. Cl.
CPC ............ *F21V 7/0008* (2013.01); *F21V 15/01* (2013.01); *F21Y 2103/10* (2016.08); *F21Y 2107/70* (2016.08); *F21Y 2115/10* (2016.08)

(58) Field of Classification Search
USPC ............... 362/487, 488, 490, 495, 152, 225, 362/217.05, 217.1, 249.02, 247, 346, 349, 362/546, 543, 544, 545
See application file for complete search history.

(56) References Cited

U.S. PATENT DOCUMENTS

| | | | | |
|---|---|---|---|---|
| 8,651,692 | B2* | 2/2014 | Yang | F21K 9/68 362/235 |
| 8,894,235 | B2* | 11/2014 | Ohno | F21V 7/0066 362/217.05 |
| 9,341,319 | B2* | 5/2016 | Huang | F21V 21/22 |
| 9,841,176 | B2* | 12/2017 | Schwarz | F21V 31/00 |
| 10,098,227 | B2 | 10/2018 | Griffoni et al. | |
| 2002/0118548 | A1* | 8/2002 | Kuenstler | F21S 43/31 362/518 |
| 2009/0296383 | A1 | 12/2009 | Valster et al. | |
| 2010/0214777 | A1 | 8/2010 | Suehiro et al. | |
| 2011/0044046 | A1* | 2/2011 | Abu-Ageel | F21K 9/68 362/259 |
| 2011/0199767 | A1* | 8/2011 | Marquardt | F21S 4/28 362/235 |
| 2013/0258652 | A1* | 10/2013 | Hsieh | F21V 13/10 362/225 |
| 2014/0355243 | A1* | 12/2014 | Yu | F21K 9/68 362/84 |
| 2014/0362574 | A1 | 12/2014 | Barrett | |

FOREIGN PATENT DOCUMENTS

| | | |
|---|---|---|
| CN | 101730820 A | 6/2010 |
| CN | 106051644 A | 10/2016 |
| DE | 10004783 A1 | 8/2001 |
| DE | 202006002728 U1 | 4/2006 |
| DE | 202015101755 U1 | 5/2015 |
| DE | 202016102798 U1 | 8/2016 |
| DE | 102015107047 A1 | 12/2016 |
| EP | 3051203 A1 | 8/2016 |
| EP | 3081845 A1 | 10/2016 |
| FR | 2956469 A1 | 8/2011 |
| JP | 2013246930 A | 12/2013 |
| WO | 2006126114 A1 | 11/2006 |
| WO | 2008137076 A1 | 11/2008 |
| WO | 2009145486 A2 | 12/2009 |

OTHER PUBLICATIONS

Search Report for International Patent Application No. PCT/EP2018/058778; dated Jul. 18, 2018.

\* cited by examiner

LIGHTING DEVICE FOR LIGHTING THE INTERIOR OF A TRANSPORTATION VEHICLE

PRIORITY CLAIM

This patent application is a U.S. National Phase of International Patent Application No. PCT/EP2018/058778, filed 5 Apr. 2018, which claims priority to German Patent Application No. 10 2017 208 999.7, filed 29 May 2017, the disclosures of which are incorporated herein by reference in their entireties.

SUMMARY

Illustrative embodiments relate to a lighting apparatus for lighting the interior of a transportation vehicle.

DETAILED DESCRIPTION

Figure 1:
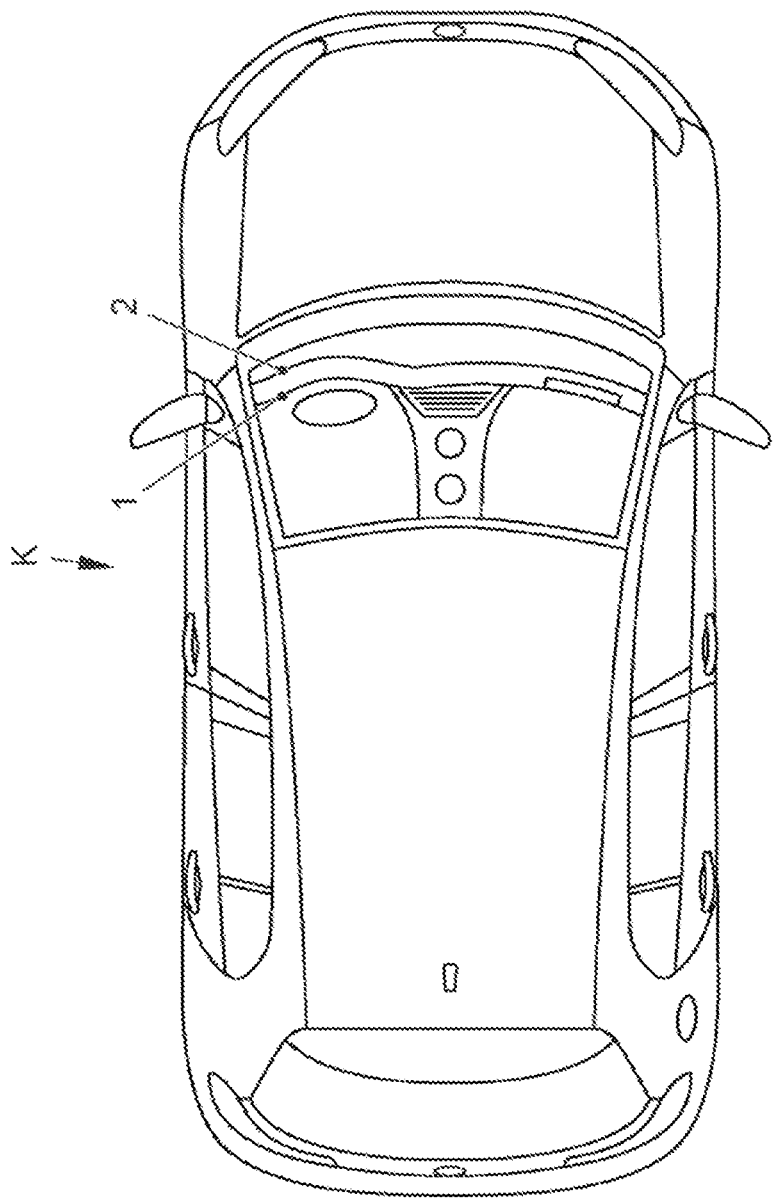
FIG. 1 shows a transportation vehicle having a disclosed lighting apparatus.

Such a lighting apparatus has been disclosed by DE 20 2006 002 728 U1. In the case of the lamp disclosed therein, the elongate housing is formed by a U-shaped profile. A similarly elongate support for LEDs (light-emitting diodes) is embedded in the base of the profile by a potting compound. The LEDs are arranged next to one another in groups in the longitudinal direction of the housing. Further, the whole of the lighting apparatus is in a flexible form. For this purpose, it is manufactured from a synthetic rubber. The width of the lighting apparatus can be a few centimeters and its length can be several meters. So that inexpensive manufacture is possible, manufacture thereof as an extruded part is proposed.

DE 10 2015 107 047 A1 proposes a lighting apparatus for indirect room lighting. Specifically, the lighting apparatus consists of a light diffuser of approximately rectangular cross section with two hollow chambers situated next to one another. The light diffuser is in strip-like form and attached by an anchor device to the underside of a displaceably mounted cabinet door. The hollow chamber of the light diffuser that faces away from the front surface of the cabinet has a light strip arranged in it having a multiplicity of LEDs. The light diffuser is manufactured from a milky-opaque, translucent material and is intended to ensure that a substantially homogenous light emission of the light delivered by a multiplicity of individual LEDs is caused.

The aforementioned lighting apparatuses cannot meet the demands in respect of a required homogeneity in the light emission desirable in the automotive sector.

The disclosed embodiment provide a lighting apparatus that meets high automotive demands in respect of homogeneity of the emitted light.

The disclosure sets out from a lighting apparatus for lighting the interior of a transportation vehicle, having an elongate housing by which a band-like support having a multiplicity of illuminants is held.

The disclosure proposes that the housing is a reflector element that has at least one reflector chamber in which beams of light deliverable or delivered by the illuminants are diffusely reflectable or reflected before they reach a light exit opening.

It has been found that a decidedly homogenous light emission is realizable with such a lighting apparatus even when point-like illuminants such as LEDs are used. The light emission is moreover also of sufficient brightness to be able to clearly perceive lighting effects in the transportation vehicle even during the day.

According to at least one disclosed embodiment, the housing is in G-like form in cross section. Such a cross section allows the reflector chamber and the light exit to be produced in a simple manner. A G-like cross section allows a long light path of the light emitted by the illuminants in proportion to the installation space. As a result, the lighting apparatus can be constructed in very compact state with high light efficiency and also affords a weight benefit in comparison with solutions with optical fibers. The long light path producible boosts the diffuse scatter of the beams of light produced.

To be able to follow a prescribed or desired contour of a light exit or to allow matching to differently bent housings, it is very expedient to design the support for the illuminants to be flexible at least in one plane. When RGB-LEDs are used, a flexible support can moreover also be used to effect substantially easier calibration of the LEDs before the support is bent into a three-dimensional shape.

To be able to help to produce an extremely homogenous light emission, it is proposed in another disclosed embodiment that the housing is made of a white, highly reflective material and/or is provided with a white, highly reflective coating.

The lighting apparatus can be of simple design and inexpensive to manufacture if, according to at least one disclosed embodiment, the cross section of the housing is formed from two profiles, each open on one side. The opening sides of the profiles project into one another. The individual profiles can then be manufactured very easily and attached to one another to produce the overall profile.

Otherwise, there are the following alternatives for the manufacture of the housing:

Manufacture by Injection Molding

This method is very reliable and fully developed and can be carried out inexpensively, in particular, for large unit numbers. Manufacture from foamed, microcellular films, optionally from polyethylene terephthalate (PET) or polycarbonate (PC). Such films have extremely good optical properties (in particular, reflection properties).

Manufacture by 3D Printing

In 3D printing, three-dimensional workpieces can be constructed in layers. This method can be used to produce any contours.

It is very beneficial if the support along with illuminants are a truncatable element such that following truncation (shortening) a remaining portion of the support continues to be fully operational. The support for the illuminants, which may be a printed circuit board, for example, can therefore be shortened as required from a length prefabricated as standard. In this manner, the support can also be used for different geometric applications. Should the length of a prefabricated support ever not be sufficient for a specific application, it is also possible for multiple supports to be concatenated.

A standard support even for different applications can significantly reduce the costs for electronics production. Calibration of illuminants arranged on a standard support of this kind is also considerably facilitated, since a calibration apparatus does not need to be manufactured separately for each instance of use. Calibration is necessary, for example, when RGD LED chips are used as illuminants. In the case of such LED chips, each LED chip has an LED emitting red light, an LED emitting green light and an LED emitting blue light. Additive color mixing, which can be produced by a suitable control device, allows any colors to be represented.

It has been found that the homogeneity in the light emission can be improved further if a light-emitting segment perceptible by a viewer is producible or produced by each illuminant, wherein the illuminants are arranged on the support at an interval from one another that is such that the producible or produced light-emitting segments overlap in an overlap region. The light-emitting segments thus merge into one another in the longitudinal extent of the lighting apparatus.

In this case, the illuminants may be spaced apart at an interval of at least approximately 15 millimeters to approximately 35 millimeters, optionally at an interval of at least approximately 30 millimeters. This allows an optimum overlap in the light-emitting segments to be attained.

It is additionally proposed to provide the cross section of the housing with an edge length of approximately 20 millimeters times 20 millimeters to approximately 30 millimeters times 30 millimeters, optionally with an edge length of approximately 25 millimeters times 25 millimeters. In this case, the cross section of the housing does not necessarily have to be square; it can also be rectangular. It is also conceivable for the sides of the housing cross section to run in slightly bent state.

The length of the housing may be approximately 300 millimeters to approximately 1500 millimeters in size.

It has been found that such a configuration of the housing allows sufficient coverage of an extremely wide variety of applications.

Finally, the disclosure is also intended to provide protection for a transportation vehicle equipped with at least one disclosed lighting apparatus.

An exemplary embodiment is depicted in the figures and is explained more specifically with reference to the figures in the description below. This also clarifies further benefits of the disclosed embodiments, too. Identical reference signs, including in different figures, relate to identical, comparable or functionally identical components. In this case, corresponding or comparable properties and benefits are achieved even if a repeat description or reference thereto is not provided. The figures are not always to scale. In some figures, proportions can be represented in exaggerated state to be able to highlight features of an exemplary embodiment more clearly.

The description refers first of all to FIG. 1.

This figure shows a transportation vehicle K designed to have a disclosed lighting apparatus 2 in the region of a dashboard 1. The lighting apparatus 2 is produced in the style of a light strip extending almost over the entire length of the dashboard 1.

Figure 2:
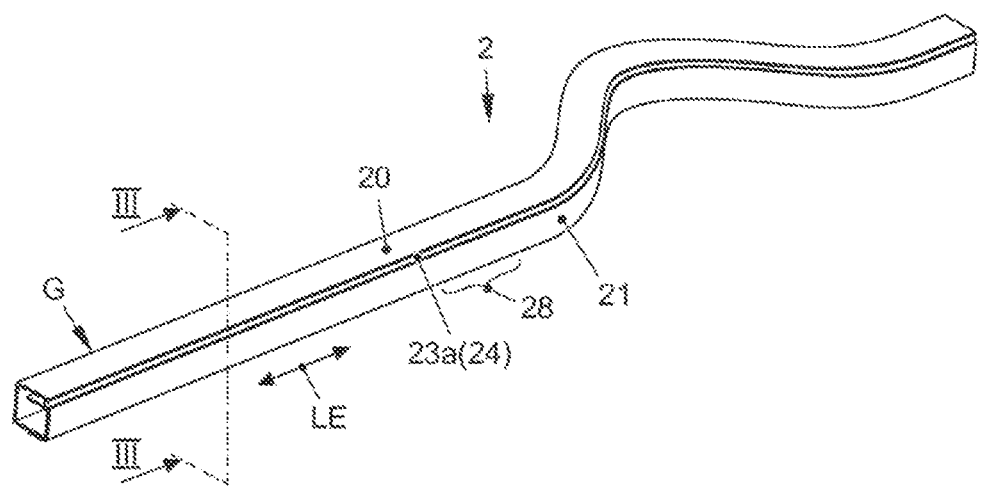
FIG. 2 shows a perspective depiction of the lighting apparatus on its own.

As can be seen from FIG. 2, the lighting apparatus 2 has an elongate housing G having a longitudinal extent LE.

The housing G is formed from two profiles 20 and 21, open on one side, that are brought together such that a slot-like light exit opening 23a is formed that continues along the whole length of the housing G.

The light exit opening 23a can be covered by a lens 24.

Figure 3:
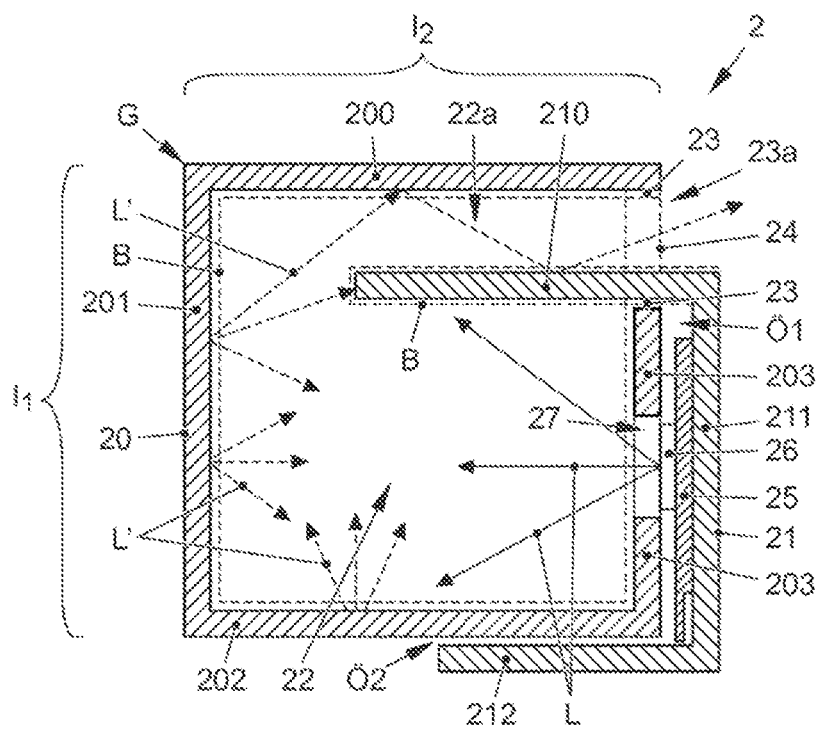
FIG. 3 shows a cross-sectional depiction according to sectional view III from FIG. 2.

The precise profile of the housing G becomes clear from FIG. 3. As such, the cross section of the housing G has an approximately G-like shape.

The profile 20 and the profile 21 have opening sides Ö1 and Ö2, that is to say sides having at least one opening, by which they are pushed into one another such that the G-like profile of the housing G is obtained.

The profile 20 has four limbs 200, 201, 202 and 203 that are approximately at right angles to one another. In this case, the limbs 200, 201 and 202 are of approximately the same length. The limb 203 is approximately one quarter of the length shorter. This results in a slot-like opening 23 between the limb 200 and the end of the limb 203.

The second profile 21 is in approximately U-like form, with limbs 210, 211 and 212. The limbs 210 to 212 are again oriented approximately at right angles to one another.

In this case, the limb 212 runs approximately parallel to the limb 202, the limb 211 runs approximately parallel to the limb 203 and the limb 210 runs approximately parallel to the limb 200.

In the pushed-together state depicted, the limb 210 projects closely over the end of the limb 203, or even touching the latter, into the opening 23 of the profile 20. This takes place over approximately two thirds of the length of the limb 200.

The lower limb 212 engages beneath the limb 202 at a short interval, or even touching, over approximately half the length of the limb 202. This exact engagement of the profiles 20 and 21 in one another allows undesirable light scatter to be avoided.

Attached to the limb 211 of the profile 21, which limb is vertical in the figure, is a band-like, that is to say elongate, support 25 having a multiplicity of illuminants 26. The support 26 optionally extends along the entire longitudinal extent LE of the lighting apparatus 2.

In this case, the illuminants 26 are spaced apart from one another at uniform intervals. Each illuminant 26 has an associated opening 27 in the limb 203 of the profile 20. In this manner, beams of light L produced by the illuminants 26 can enter a reflector chamber 22 formed at least in part by the inner sides of the limbs 210, 203, 202 and 201.

As indicated by the beams of light L', the beams of light L radiated into the reflector chamber 22 by the illuminants 26 are repeatedly diffusely reflected in the reflector chamber 22 before the reflected beams of light L' enter a light exit chamber 22a and can exit the housing G at that point via the light exit opening 23a.

The light exit opening 23a is formed by the limb 200 of the profile 20 and the limb 210 of the profile 21, which latter limb projects into the former profile. The optional lens 24 is indicated in dashes. The limb 210 also leads to the formation of the light exit chamber 22a, which is separated from the reflector chamber 22.

It becomes clear that a long coverable light path of the light transmitted by the illuminants 26 in proportion to the required installation space is attainable by virtue of the G-like configuration of the housing G. In this manner, the lighting apparatus 2 can be kept extremely compact.

To assist diffuse reflection in the reflector chamber 22 and to minimize light losses, the profiles 20 and 21 may be made of a highly reflective, particularly, white material. Alternatively or additionally, the profiles 20 and 21 can have at least regions provided with a highly reflective, particularly, white coating B (indicated in dashes).

To allow bending of the lighting apparatus 2 (cf. also FIG. 2), both the profiles 20, 21 and the band-like support 25 and also the optional lens 24 are formed from a flexible material.

The profile of the housing G may have an edge length I1 times I2 of approximately 25 millimeters times 25 millimeters.

As already mentioned, the beams of light L of the illuminants 26 that enter the housing G are diffusely reflected, with only extremely low reflection losses. The level of reflection may be greater than 98 percent, which means that the reflection behavior inside the housing G approaches the emission characteristic of a Lambertian emitter. It should also be pointed out that, as a departure from the exemplary embodiment, the limbs of the housing G may also be curved or inclined.

Figure 4:
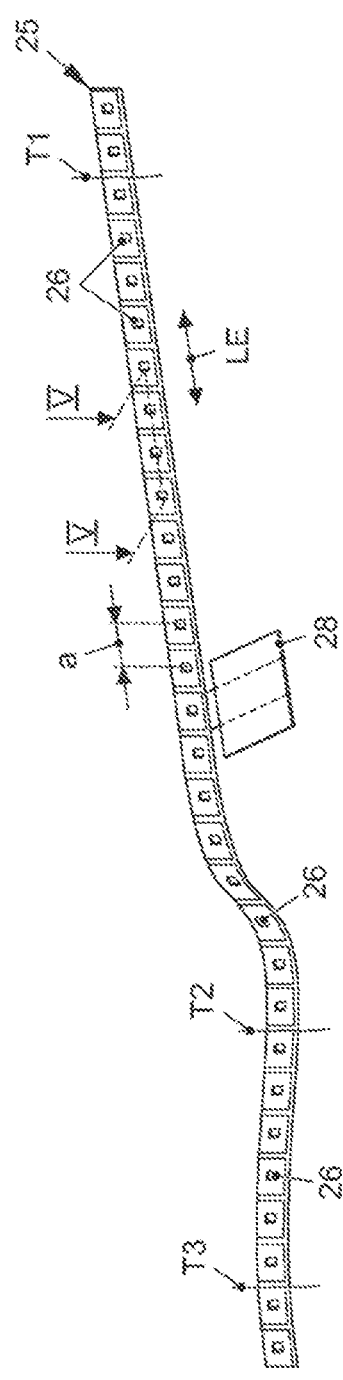
FIG. 4 shows a perspective depiction of the band-like support for the illuminants.

The band-like support 25 will now be examined more specifically on its own with reference to FIG. 4.

The support 25 is, as already described, in band-like and flexible form. It is, for example, a printed circuit board carrying the illuminants 26.

Optionally, the illuminants 26 are arranged at an interval a from one another along a longitudinal extent LE of the support 25 over the entire length of the support 25.

The illuminants 26 can be light-emitting diodes (LEDs), in particular, RGB light-emitting diodes for transmitting light in a multiplicity of colors.

The interval a of the illuminants 26 may be approximately thirty millimeters, and optionally approximately thirty illuminants 26 are arranged on the support 25.

Further, it can be seen that the support 25 is connected to a circuit board 28. The circuit board 28 is provided with a voltage transformer, a bus interface and a microcontroller for actuating the illuminants 26 in suitable state, quickly and at the right voltage (cf. also FIG. 2).

Quite particularly, the support 25 is an identical part. That is to say that the support 25 is always produced in the same manner, that is to say with the same length and the same number of illuminants 26, even for different applications. To match it to different geometric applications, the support 25 can be variably severed or shortened at an extremely wide variety of separation points between the illuminants 26. This is conceivable at separation points T1, T2 or T3, depicted only in exemplary state. After such shortening (truncation) at a separation point, the remainder of the support 25 that is left, along with the circuit board 28, is still fully operational. Subsequently, the support 25 can be bent (at least in one plane) to produce the desired contour.

By realizing the support 25 as a flexible identical part for different applications as described, it is possible for the costs for producing the support to be significantly reduced.

The same tool can always be used and also any necessary calibration of the illuminants 26 is simplified. When the illuminants 26 are RGB light-emitting diodes, calibration is necessary, at least according to the present prior art. Such calibration enables the RGB LEDs to emit light in defined, identical colors, and in this way the basic prerequisite for a homogeneous appearance of light is ultimately achieved. The calibration can always take place in the same manner using the same tool after the support 25 is fitted with the illuminants 26, before the flexible support 25 is possibly also bent into a desired shape following the shape of the housing G.

The application in which a length of the support 25 is not sufficient is also conceivable. In this case, multiple supports 25 can be installed in a suitable housing. If need be, one of the supports 25 can then in turn be shortened as needed.

Figure 5:
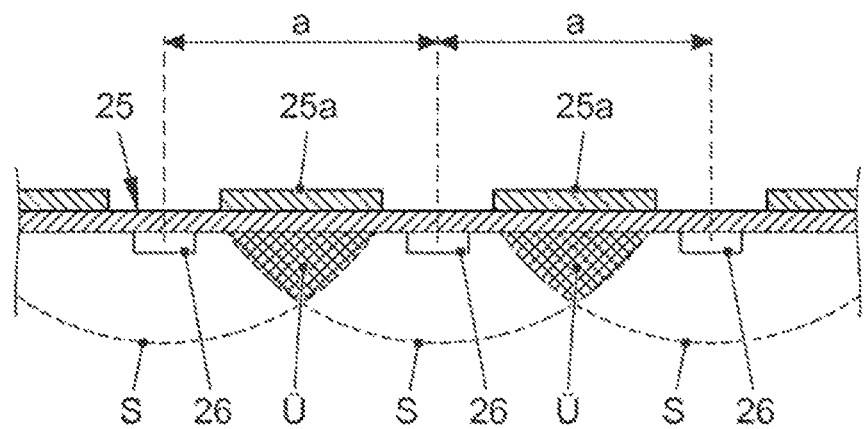
FIG. 5 shows a sectional depiction according to section view V from FIG. 4.

A partial sectional view of the support 25 can be seen from FIG. 5. In this case, it is discernable that rigid material elements 25a have been put onto the side of the support 26 that is remote from the illuminants 25. The material elements 25a are made from a thermally conductive material and enable better heat distribution on the support 25 and better heat dissipation.

Each illuminant 26 produces a specific, hemispherical light-emitting segment S on account of its emission characteristic.

It is very beneficial if the interval a of the illuminants 26 is chosen such that the light-emitting segments S of the individual illuminants 26 overlap, that is to say merge into one another, in a marginal region. This is the case in the exemplary embodiment. Therefore, overlap regions Ü are depicted.

Owing to the overlap, the light-emitting segments S visible to a viewer are no longer distinguishable from one another and no longer enumerable, meaning that this contributes to a very homogeneous appearance of light for the lighting apparatus 2.

As an exemplary embodiment, a total length of the housing G of approximately 900 millimeters to approximately 1000 millimeters is obtained with the optionally chosen intervals a, given fitting with thirty illuminants 26 and the optionally chosen edge lengths I1, I2.

Figure 6:
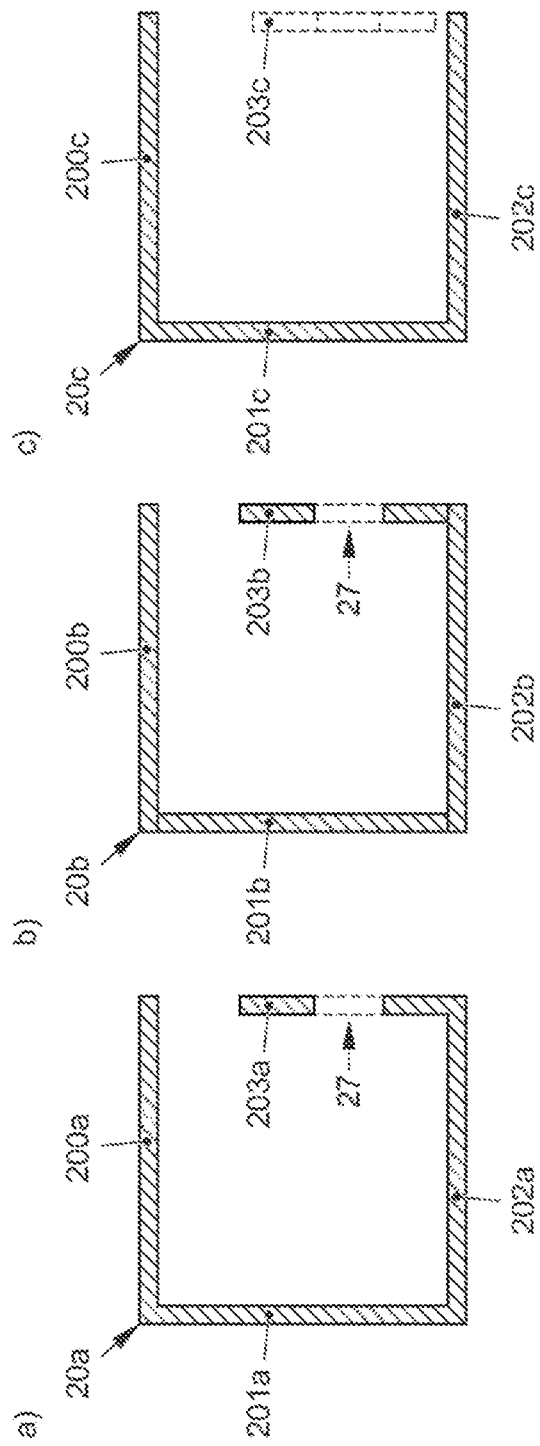
FIG. 6 shows the depiction of a profile used for the housing of the lighting apparatus in cross section based on production variations.

Finally, the effect of different methods of manufacture on the configuration of the profiles of the housing G is also illustrated on the basis of FIG. 6.

As such, according to FIG. 6a, it is, for example, conceivable to manufacture a profile 20a of the lighting apparatus by 3D printing. 3D printing involves the profile 20a being constructed under computer control according to prescribed dimensions and shapes to produce the final workpiece. Limbs 200a, 201a, 202a and 203a are thus integrally (materially) joined to one another, with extremely small geometric restrictions existing. Many different materials are conceivable for the profile 20a, for example, plastic, artificial resin or metal.

FIG. 6b depicts a profile 20b made of foamed plastic films, for example, of polyethylene terephthalate (PET) or polycarbonate (PC). Such films have distinguished diffuse reflection properties. They are only flexible in one plane, however. In the specific case, vertical limbs 201b and 203b therefore need to be bent in the desired shape and horizontal limbs 200b and 202b need to be punched out accordingly and joined to the other limbs. The limbs may be joined by welding.

Finally, injection molding must also be cited as an option method of manufacture, for which plastic is suitable as a material. However, the geometry is restricted in this case too. Only a U-shaped profile 20c having limbs 200c, 201c and 202c at right angles to one another is manufacturable in one work cycle. An undercut caused by a limb 203c is therefore inconceivable owing to demolding being impossible. In this case, the limb 203c must thus likewise be added afterwards (cf. FIG. 6c).

LIST OF REFERENCE SIGNS

1 Dashboard
2 Lighting apparatus
20, 20a, 20b, 20c Profile
21 Profile
22 Reflector chamber 22a Light exit chamber
23 Opening
23a Light exit opening
24 Lens
25 Band-like support
25a Rigid material elements
26 Illuminants
27 Openings
28 Circuit board
200-203 Limbs
200a-203a Limbs
200b-203b Limbs
200c-203c Limbs
210-212 Limbs
a Interval
B Highly reflective coating
G Housing
K Transportation vehicle
l1, l2 Edge length
L Beams of light
L' Beams of light
LE Longitudinal extent
Ö1, Ö2 Opening sides
S Light-emitting segments
T1-T3 Separation points
Ü Overlap

The invention claimed is:

1. A lighting apparatus for lighting the interior of a transportation vehicle, the lighting apparatus comprising:
an elongate housing; and
a band support having a multiplicity of illuminants held, by the housing,
wherein the housing includes a reflector element that has at least one reflector chamber in which beams of light deliverable or delivered by the illuminants are diffusely reflectable or reflected before the beams of light reach a light exit opening; and
wherein the cross section of the housing is formed from two profiles, each open on one side, and wherein the opening sides of each of the two profiles project into one another.

2. The lighting apparatus of claim 1, wherein the housing is in G form in cross section.

3. The lighting apparatus of claim 1, wherein the support for the illuminants is flexible.

4. The lighting apparatus of claim 1, wherein the housing is made of a white, highly reflective material and/or is provided with a white, highly reflective coating.

5. The lighting apparatus of claim 1, wherein the support is a variably truncatable element such that, following truncation, a remaining portion of the support continues to be fully operational.

6. The lighting apparatus of claim 1, wherein a light-emitting segment perceptible by a viewer is producible or produced by each illuminant, wherein the illuminants are arranged on the support at an interval from one another that is such that the producible or produced light-emitting segments overlap in an overlap region.

7. The lighting apparatus of claim 6, wherein the interval of the illuminants is at least approximately 15 mm to approximately 35 mm in size.

8. The lighting apparatus of claim 1, wherein the cross section of the housing has an edge length of approximately 20 mm×20 mm to approximately 30 mm×30 mm.

9. A transportation vehicle, comprising at least one lighting apparatus of claim 1.

10. A lighting apparatus for lighting the interior of a transportation vehicle, the lighting apparatus comprising:
an elongate housing; and
a band support having a multiplicity of illuminants held, by the housing,
wherein the housing includes a reflector element that has at least one reflector chamber in which beams of light deliverable or delivered by the illuminants are diffusely reflectable or reflected before the beams of light reach a light exit opening; and
wherein the housing is in G form in cross section.

11. The lighting apparatus of claim 10, wherein the support for the illuminants is flexible.

12. The lighting apparatus of claim 10, wherein the housing is made of a white, highly reflective material and/or is provided with a white, highly reflective coating.

13. The lighting apparatus of claim 10, wherein the cross section of the housing is formed from two profiles, each open on one side, and wherein the opening sides of each of the two profiles project into one another.

14. The lighting apparatus of claim 10, wherein the support is a variably truncatable element such that, following truncation, a remaining portion of the support continues to be fully operational.

15. The lighting apparatus of claim 10, wherein a light-emitting segment perceptible by a viewer is producible or produced by each illuminant, wherein the illuminants are arranged on the support at an interval from one another that is such that the producible or produced light-emitting segments overlap in an overlap region.

16. The lighting apparatus of claim 15, wherein the interval of the illuminants is at least approximately 15 mm to approximately 35 mm in size.

17. The lighting apparatus of claim 10, wherein the cross section of the housing has an edge length of approximately 20 mm×20 mm to approximately 30 mm×30 mm.

18. A transportation vehicle, comprising at least one lighting apparatus of claim 10.

* * * * *